United States Patent
Jhunjhunwala et al.

(10) Patent No.: US 10,361,567 B2
(45) Date of Patent: Jul. 23, 2019

(54) COMPLEMENTARY ENGAGEMENT OF BATTERY BANKS TO AUGMENT LIFE, PERFORMANCE AND CAPACITY OF ENERGY STORAGE SYSTEM

(71) Applicants: Indian Institute of Technology Madras (IITM), Chennai (IN); Reliance-IITM Telecom Centre Of Excellence, Chennai (IN)

(72) Inventors: Ashok Jhunjhunwala, Chennai (IN); Prabhjot Kaur, Chennai (IN)

(73) Assignees: INDIAN INSTITUTE OF TECHNOLOGY MADRAS (IITM), Chennai, TN (IN); RELIANCE - IITM TELECOM CENTRE OF EXCELLENCE, Chennai, TN (IN)

(*) Notice: Subject to any disclaimer, the term of this patent is extended or adjusted under 35 U.S.C. 154(b) by 188 days.

(21) Appl. No.: 15/447,061

(22) Filed: Mar. 1, 2017

(65) Prior Publication Data

US 2017/0229876 A1 Aug. 10, 2017

Related U.S. Application Data

(63) Continuation-in-part of application No. 15/422,641, filed on Feb. 2, 2017, now abandoned.

(30) Foreign Application Priority Data

Feb. 5, 2016 (IN) .............................. 201641004169

(51) Int. Cl.
*H02J 7/00* (2006.01)
*H02J 7/14* (2006.01)
(Continued)

(52) U.S. Cl.
CPC ............ *H02J 7/0003* (2013.01); *B60L 58/13* (2019.02); *B60L 58/14* (2019.02); *B60L 58/16* (2019.02); *B60L 58/21* (2019.02); *H01M 10/4207* (2013.01); *H02J 7/0063* (2013.01); *H02J 7/0068* (2013.01); *H02J 2007/0067* (2013.01); *Y02T 10/7005* (2013.01); *Y02T 10/7044* (2013.01); *Y02T 10/7061* (2013.01)

(58) Field of Classification Search
USPC ........ 320/128, 134, 135, 103, 119, 130, 132
See application file for complete search history.

(56) References Cited

U.S. PATENT DOCUMENTS 5,798,939 A * 8/1998 Ochoa ................ G06Q 30/0283
700/286
6,369,578 B1 * 4/2002 Crouch, Jr. ........ G01R 31/3648
320/134

(Continued)

*Primary Examiner* — Alexis B Pacheco (57) ABSTRACT

The embodiments herein provide an energy storage battery system constituting multiple banks of individual batteries, each of which may have different characteristics, and methods of operation of the system. The multiple battery banks configuration is based on split battery configuration derived by a splitter based on a probability distribution function (pdf) of expected usage pattern, optimization goal, and battery characteristics of a corresponding single battery system. The energy system optimizes at least one of cost, weight or size of the overall system by rotating usage of various battery banks based on usage pattern.

26 Claims, 8 Drawing Sheets

(51) Int. Cl.
*H01M 10/42* (2006.01)
*B60L 58/16* (2019.01)
*B60L 58/14* (2019.01)
*B60L 58/13* (2019.01)
*B60L 58/21* (2019.01)

(56) References Cited

U.S. PATENT DOCUMENTS

| | | | |
|---|---|---|---|
| 2007/0013347 A1* | 1/2007 | Kamohara | B60K 6/48 |
| | | | 320/160 |
| 2007/0120536 A1* | 5/2007 | Runkle | H01M 10/441 |
| | | | 320/136 |
| 2010/0019718 A1* | 1/2010 | Salasoo | B60L 3/0046 |
| | | | 320/103 |
| 2011/0012661 A1* | 1/2011 | Binder | A63F 9/24 |
| | | | 327/276 |
| 2013/0026822 A1* | 1/2013 | Chao | H02J 1/14 |
| | | | 307/9.1 |
| 2013/0175975 A1* | 7/2013 | Shinozaki | B60L 11/1864 |
| | | | 320/106 |
| 2016/0064970 A1* | 3/2016 | Shimizu | H02J 3/386 |
| | | | 320/134 |
| 2016/0239759 A1* | 8/2016 | Sung | G06N 99/005 |
| 2016/0241031 A1* | 8/2016 | Hooshmand | H02J 3/38 |
| 2017/0126027 A1* | 5/2017 | Park | B60L 3/0046 |
| 2017/0271984 A1* | 9/2017 | Kohn | H02M 3/156 |

* cited by examiner

COMPLEMENTARY ENGAGEMENT OF BATTERY BANKS TO AUGMENT LIFE, PERFORMANCE AND CAPACITY OF ENERGY STORAGE SYSTEM

This application is based on, and is a continuation-in-part of U.S. patent application Ser. No. 15/422,641 filed on 2 Feb. 2017, which claims priority from Indian Application Number 201641004169 filed on 5 Feb. 2016, the disclosure of which is hereby incorporated by reference.

TECHNICAL FIELD

The embodiments herein generally relate to an energy storage system, and more particularly, to an energy storage system including a plurality of battery banks of different characteristics.

BACKGROUND

The demand for clean energy has risen rapidly in recent years, especially energy provided through rechargeable batteries or any other energy sources. As a result, rechargeable batteries are being used in more and more applications to provide power to automobiles, tools, electronics, computers, homes, and so on. The batteries are most expensive part of a power system and using battery storage as a source of power increases cost of power multi-fold. The rapid increase in a number of batteries has accordingly increased the need for efficient engagement and utilization of such batteries. These batteries are chargeable, but the charging opportunity available is intermittent (when one is stationary and/or next to a power source for some significant time). Similarly some energy sources have limited fuel-charging opportunities.

Generally, there are certain parameters that characterize the batteries and its selection for a particular application. Some of the decisive parameters are chemistry of battery, variability in its chemistry, energy density, size, weight and cost etc. A combination of such parameters contribute to battery life, measured in terms of number of charge-discharge cycles, and help in making decisions on the most important factors in selecting a battery. The battery life in turn depends on how the battery is used, in particular, Depth of Discharge (DoD), rates of charging and discharging, operating temperature etc. These parameters, and especially battery life, also greatly influence costs. The battery life greatly influences overall cost of usage, as one has to replace batteries after expiry of life-time. In the conventional systems (like an electric car), most of the applications use a single battery bank of a single kind, with the choice made based on costs, life-cycles, energy-density, or the like.

In certain applications, however, such as diesel trucks, laptops and boats where multiple batteries are used, so that they may be combined and effectively engaged to provide the necessary power, the vehicle may fail to start or function appropriately. Such applications generally will not automatically engage and utilize multiple battery banks effectively, or in a cost-conscious manner.

Further, mobile applications such as electric vehicles, laptops, cell-phones or the like use a battery which is charged when the battery is about to run out or when there is a charging opportunity available. User may like to have largest size battery, so that system can be used for long time without charging but it contributes to increase size, weight and cost of such mobile appliances/equipment.

The above information is presented as background information only to help the reader to understand the present invention. Applicants have made no determination and make no assertion as to whether any of the above might be applicable as Prior Art with regard to the present application.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

Charging opportunity: when the user gets access to a source of power to charge battery for a considerable period of time.

Battery usage and Range/hours of usage: battery is usually operated in some range of DOD (say 10% to 90% DOD)

to not severely affect the life of the battery, and avoiding deep-discharge. The Range/hours of usage referred to here, is assumed to be when the battery is used in this range.

Referring now to the drawings, and more particularly to FIGS. 1 through 8, where similar reference characters denote corresponding features consistently throughout the figures, there are shown preferred embodiments.

Accordingly, the embodiments herein provide an energy storage battery system constituting multiple banks of individual batteries, each of which may have different characteristics, and methods of operation of the system. The system includes at least a plurality of battery banks of individual batteries based on split configuration derived by a splitter, and a logic control unit. The split battery configuration of the plurality of banks varies based on a probability distribution function (pdf) of expected usage pattern between two charging opportunities, optimization goal, and battery characteristics of a corresponding single battery system.

In a preferred embodiment, the logic unit is pre-configured with the pdf and information on available batteries with different characteristics to obtain the split of a battery into multiple battery banks, with the objective to obtain performance of each of the battery banks. The logic further provides the algorithm to select at least one battery bank, from the plurality of battery banks, to provide power to a load based on current performance data of each said battery banks and at least one selection criterion. The control algorithm rotates use of battery banks from the plurality of battery banks until next charging opportunity. The battery system is then built using different battery banks and a logic controller with the above algorithm to use the battery banks.

The split configuration derived using the splitter is to optimize at least one of cost, weight or size of the system. The selection of at least one battery bank is based on the pdf. The selection of battery banks is to optimize at least one among weight, cost, size, and life of the storage system for the given usage pattern without compromising on the range of the system.

Figure 1:
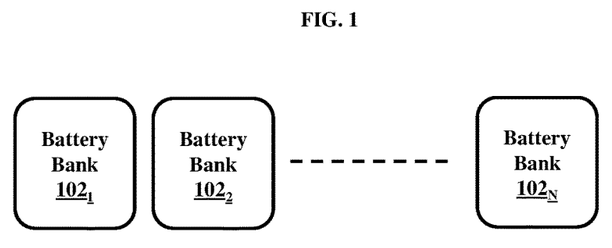
FIG. 1 illustrates multiple banks of individual batteries to be used in an energy storage system, according to an embodiment herein.

The embodiments herein provide an energy storage battery system constituting multiple banks of individual batteries, as illustrated in FIG. 1, each of which may have different characteristics, vis-à-vis, chemistry, energy density, lifetime, weight, cost, and so on. Splitting of the energy storage battery system into banks is chosen based on statistics of usage of the battery.

The splitting of a battery involves identifying and selecting a set of battery banks corresponding to a single battery to achieve an optimization goal. An optimization goal can include but is not limited to lower cost, lower weight, lower size, and increase lifetime of the energy storage system as a whole.

Figure 2:
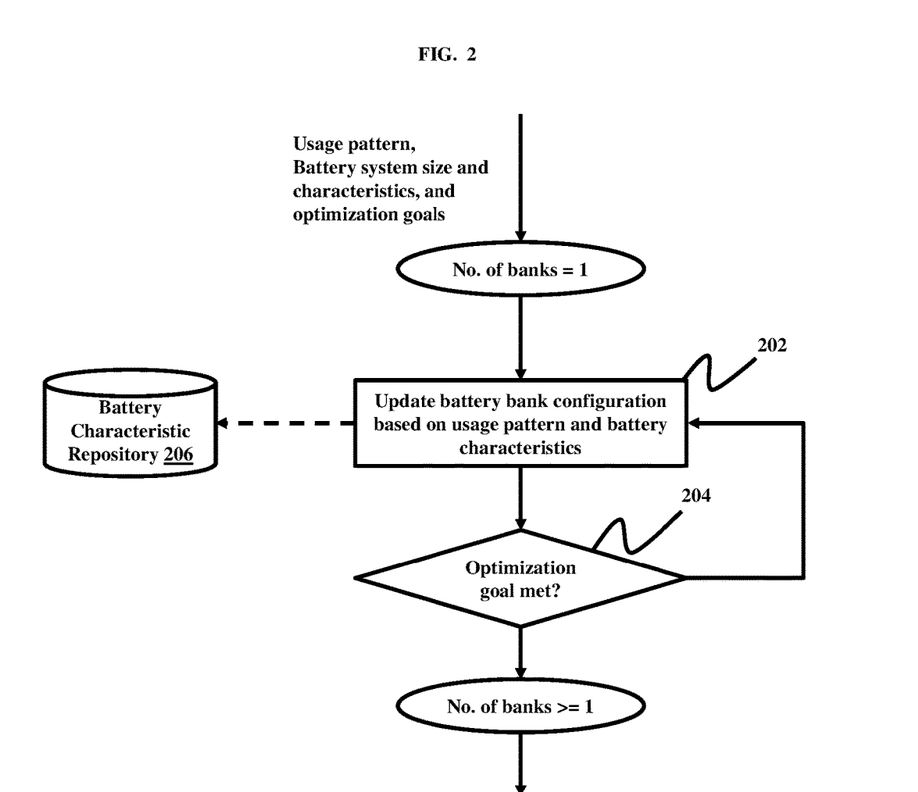
FIG. 2 illustrates process of arriving at a split battery configuration, according to an embodiment herein.

FIG. 2 illustrates process of arriving at a split battery configuration, according to an embodiment herein. The process of splitting according to various embodiments herein can be enabled by a splitter configured to accept optimization goal, usage pattern information, and characteristics of a single battery as initial input. The computer can perform heuristic based analysis to update (202) the battery configuration from input battery configuration. In performing the heuristic analysis, the computer can check external battery characteristic repository (206) containing information about various batteries with varying characteristics including but not limited to cost, weight, size, chemistry, and so on. The computer checks (204) to see if the updated battery configuration achieves the optimization goal. If the optimization goal is not met, the computer further updates the battery configuration towards achieving the optimization goal.

Once split, a custom hardware device having embedded software with logic would derive the split battery configuration. The logic that the custom computer can employ to arrive at a split battery configuration is described hereunder through various examples.

In various embodiments, the computer can adopt available machine learning techniques to learn from previous battery configurations and, therefore, to provide more accurate battery configurations for the input optimization goals. The learning may be fed back to the process as illustrated in FIG. 2 to improve performance. The learning of performance of each battery bank under partial charge—discharge and its impact on life-time is also fed back to battery characteristic repository, to further optimize the split.

Figure 3A:
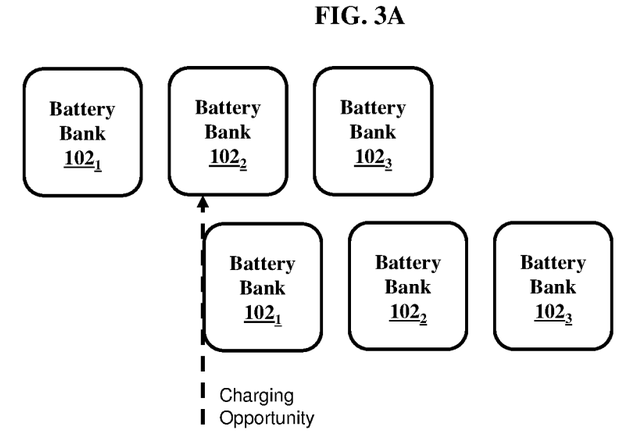
FIG. 3A and FIG. 3B illustrate an example of the sequential usage of battery banks until next charging happens using a three battery bank system as an example, according to an embodiment herein.
Figure 3B:
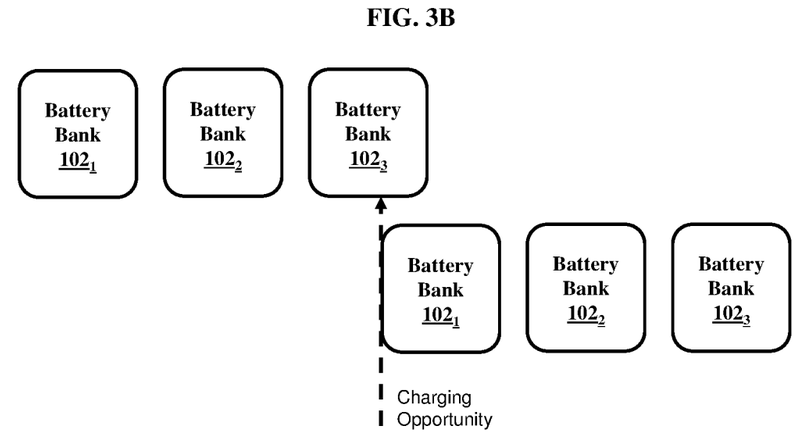

In a preferred embodiment, the battery banks are configured to be used/discharged in a sequence based on pre-defined priorities for the usage of the battery banks, where a bank is drained as per set limit before a subsequent bank is used. The discharge sequence is reset as soon as a charging opportunity arrives. FIG. 3A and FIG. 3B illustrate an example of the sequential usage of battery banks until next charging happens using a three battery bank system as an example. In FIG. 3A, the discharge starts with battery bank $102_1$ and proceeds to $102_2$. While the battery bank $102_2$ is in the process of discharge, a charging opportunity arrives. Upon the charging event, the battery system reverts to using battery bank $102_1$. Similarly, in FIG. 3B, the charging opportunity arrives when the battery bank $102_3$ is in process of discharge subsequent to full discharge of batter banks $102_1$ and $102_2$. The battery system reverts to using battery bank $102_1$ after charging. This implies that bank $102_1$ will be discharged-charged used more often than bank $102_2$, which in turn will be used more often than bank $102_3$. The charging of all the battery-banks, on the other hand is to take place simultaneously, in parallel.

Example application: Electric vehicles

Cost considerations

By using battery banks of different characteristics, embodiments herein allow for reducing overall cost or weight or size or a combination thereof of the battery system as compared of a battery system with single bank with desired characteristics. Hereafter, electric vehicles are considered as an application for such a battery system. Vehicles are driven to different extent at different time of day and on different days at a time. Some days, one drives short distances and some other days a bit longer. On other days, one may drive for really long completely exhausting battery capacity of the vehicle. And, therefore, the time between two charging opportunities also varies. A charging opportunity implies that the vehicle is present near a power-source, where there is a charger for sufficient duration to get charged to the required extent. The energy storage system (meaning, the battery system) of the vehicle would normally be charged fully during a charging opportunity, but need not be fully charged in a single charging opportunity.

Figure 4:
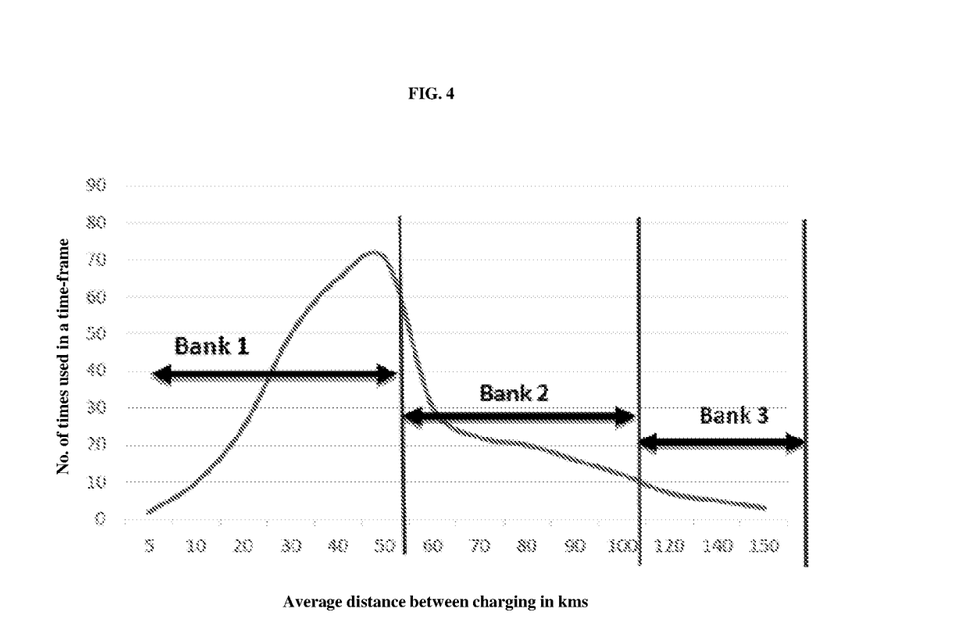
FIG. 4 is one such example indicating statistical usage of vehicle between two charging opportunities, assuming that the total battery capacity allows vehicle to travel up to 150 km while using the battery in the range not impacting the life of the battery adversely, according to an embodiment herein.

FIG. 4 is one such example indicating statistical usage of vehicle between two charging opportunities, assuming that the total battery capacity allows vehicle to travel up to 150 km while using the battery in the range not impacting the life of the battery adversely. The numbers are chosen in example by way of illustration and could be completely different numbers without altering the logic of argument here. Battery system considered has three banks, each of which enables vehicle to travel 50 km during normal usage without deep-discharge. The FIG. 4 in other words, represents the probability density function (pdf) of vehicle usage between two charging opportunities, which is not normalized, and will represent true pdf if divided by the total area under the curve. As shown, most of the time, the vehicle travels less than 50 km and therefore uses only bank 1 before getting charging opportunity. However, at times, the vehicle travels between 50 km to 100 km before getting charging opportunity and there for uses both banks 1 and 2. Still less number of times it travels above 100 km before it gets charging opportunity and therefore uses banks 1, 2 and 3. The area under each of the three curves (separated by vertical lines at 50 km and 100 km) normalized by dividing the total area of the curve, provides the percentage of time only bank 1 is used or when banks 1 and 2 are used and when banks 1, 2 and 3 are used. In the example, 70% of time, distance driven is less than 50 km, 25% of time it is driven between 50 and 100 km, and 5% of time the distance between charging opportunity is beyond 100 km.

Now, consider three banks of batteries (named, B1, B2, and B3) as an example, each with capacity to enable distance travelled as 50 km, and with properties as provided in Table 1 hereunder.

TABLE 1

Properties of battery banks B1, B2, and B3

|  | B1 | B2 | B3 |
|---|---|---|---|
| Life Cycles | 3000 | 900 | 150 |
| Cost | 8 | 4 | 1 |
| Usage | 100% usage time | 30% usage time, along with B1 | 5% usage time, along with B1 and B2 |

In the example configuration provided in Table 1, B1 has much higher number (3000) of charge-discharge cycles, B2 has lesser cycles (900), and B3 has even lesser (only 150). The battery bank costs decrease significantly with decrease in life-cycle requirements and one can choose the bank with appropriate chemistry or other characteristics to optimise the costs. In the example configuration, B2 could cost half of the cost of B1 and B3 one eighth the cost of B1. If the cost of B3 is X, the total cost of three banks would be 13X. A single battery bank used in a conventional system with 3000 charge discharge cycles would have to be of B1 type and would cost three times that of B1 because its size is three times that of B1 and therefore the total costs would work out to be 24X. This is almost double of 13X, the costs of a three-bank battery. Thus dividing the battery into banks and using batteries of appropriate characteristics for each bank, one can save costs. Alternatively, one can reduce weight, reduce size or even increase the range.

Performance considerations

Embodiments herein allow reducing costs without degradation in performance of the battery system. According to FIG. 4, 70% of time vehicle is going to drive less than 50 km before the next charging opportunity. Therefore, B1 alone will be used 70% of the time. In a preferred embodiment, B2 is used only after B1 completely discharges, and B3 only after B1 and B2 completely discharge. Furthermore, B2 along with B1 will be used approximately 25% of time (for driving distance between 50 and 100 km), and B3 along with B1 and B2 will be used about only 5% of time (for driving distance beyond 100 km). Since B1 has been chosen to be 3000 charge discharge cycles and is used in all journeys, the vehicle can perform 3000 journeys between changes. B2 is used only when vehicle travels beyond 50 km, which happens only in 30% of journeys. Therefore, 900 cycles should be adequate for B2 (as opposed to 3000 cycles). Consequently, a lower cost battery can be chosen for B2. Further, B3 is used only in 5% of journeys, and, hence, 150 cycles are should be adequate for B3 to last as long as B1 and B2. Therefore, B3 can have lower cost batteries when compared to B2. We have assumed in the above calculations that DOD does not play a role in life-cycles. Lower DOD, as would be the case if the battery is charged after less than 150 km drive, even for a single bank battery would help extend the life-cycles beyond 3000.

But the degradation of battery life as the battery is used year after year will start impacting more now. Similarly, as DOD will vary for trip to trip even for each bank of the three battery-bank system, the batteries could last longer. The advantage for a single battery would not be therefore as significant as the cost reduction discussed above.

Weight considerations

Apart from optimizing cost and performance, the battery system according to embodiments herein can also be used to manage overall weight of system. Table 2 provides an example configuration of battery banks.

TABLE 2

|  | B1 | B2 | B3 |
|---|---|---|---|
| Usage | 100% of times | 30% of times | 5% of time |
| Weight | W | W | W/2 |
| Cycles | 3000 | 900 | 150 |
| Capacity | X | X | X |

In the example configuration provided in Table 2, battery bank B1 is used 100% of the time with 3000 cycles, B2 is used 30% of the time with 9000 cycles, and B3 is used 5% of the time with 150 cycles. We select the three batteries such that while B1 and B2 are of same weight W, B3 is selected to be lighter and say it weighs W/2. Thus the weight of all the battery banks would be 2.5 W. In contrast, a traditional single bank battery system, which is three times B1, would weigh 3 W. Thus the banks may enable us to reduce weight as opposed to single bank, without compromising on performance.

In various embodiments, with multiple battery banks, performance can be further optimized to give longer range without increasing the weight of the system. Table 3 provides such an example configuration of the battery system according to embodiments herein. Here the capacity is doubled when keeping the weight of B3, same as that of B1 and B2.

TABLE 3

|  | B1 | B2 | B3 |
|---|---|---|---|
| Usage | 100% of times | 30% of times | 5% of time |
| Weight | W | W | W |
| Cycles | 3000 | 900 | 150 |
| Capacity | X | X | 2X |

In Table 3, the capacity of third bank B3 is chosen to be twice the size of that of B1 and B2, giving twice the range that B1 or B2 would provide. This is an example of unequal size (in capacity) banks. Assuming the costs of each of the batteries in each bank to be same as was in Table 1 for same capacity, the costs would now be 14X as opposed to 24X for single bank battery. The total weight is same as that of single bank battery. The range supported however is now 200 km as opposed 150 km for single battery. The driving distance now increases, to 4/3 times of that of a single bank, as total battery capacity of three banks is equal to 4/3 times of battery capacity of single bank.

The splitting of the battery into banks is based on pdf of usage between two charging opportunity and availability of batteries of different life-cycles, so as to optimize costs, weight, range etc. The logic control to use different battery-banks will help deliver the performance.

Figure 5:
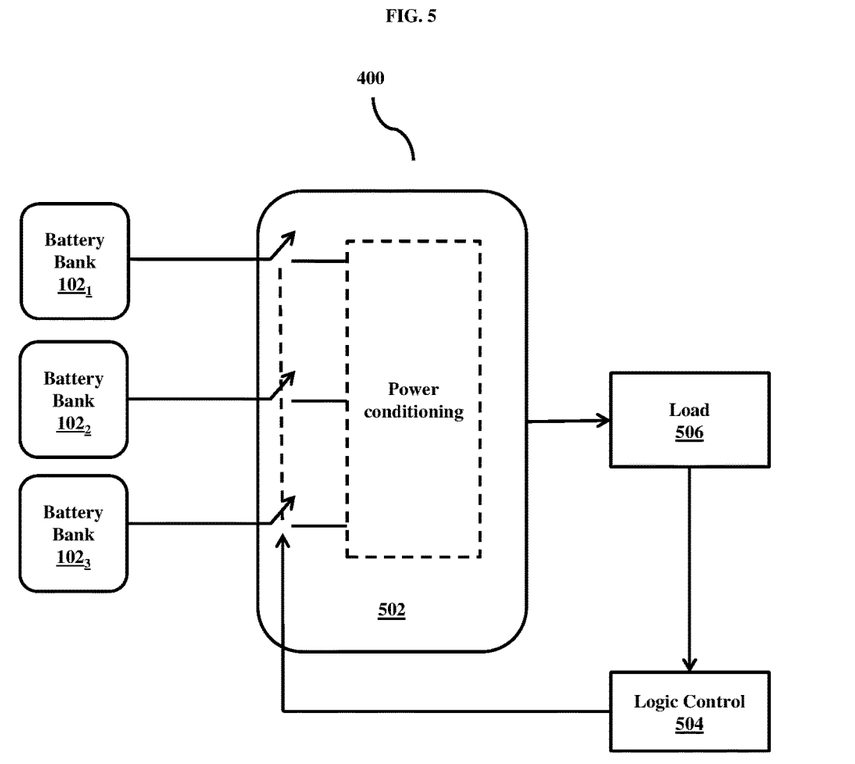
FIG. 5 illustrates an example implementation of energy storage system, according to an embodiment.

FIG. 5 illustrates an example implementation of energy storage system, according to an embodiment. In FIG. 5, the logic control unit 504 controls how and which battery bank is connected to the load 506 through a switching mechanism shown in 502.

Figure 6:
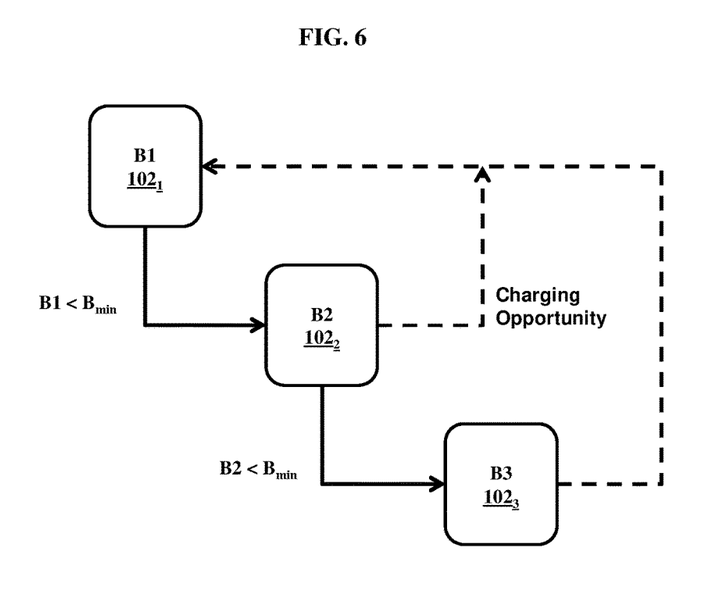
FIG. 6 illustrates the switching of the batteries based on a single threshold minimum SOC $B_{min}$ in a three bank battery system, according to a preferred embodiment.

In an example implementation, the logic control unit 504 performs necessary logic operations to check configured threshold of the State of Charge (SOC) values for each battery bank, and switch from one battery bank to another. If $B_{min}$ is the minimum threshold battery SOC level for each battery bank, the logic control unit switches to the next battery when a battery bank hits the threshold SOC level. FIG. 6 illustrates the switching of the batteries based on a single threshold minimum SOC $B_{min}$ in a three bank battery system, according to a preferred embodiment. According to FIG. 6, the system starts with battery bank B1, and switches to B2 when B1 hits the SOC level $B_{min}$, and subsequently from B2 to B3 when B2 hits the minimum configured SOC level and so on until next charging. When next charging happens, the system reverts to using battery bank B1 and the same flow continues.

In other embodiments, different minimum threshold SOC levels can be configured for each of the battery banks individually.

In various embodiments, the logic control unit can be configured with pre-set power harnessing modes. A power harnessing mode as well as selection of banks is uniquely defined and customized for specific user-behavior types (city driving, long-distance driving, taxis etc.) or specific locations based on one or more usage parameters including but not limited to DoD, charging rate, temperature of the system, speed of operation, rate of power (or fuel) consumption, operational load, and other internal and external environmental factors. Further, the logic control unit can be configured to automatically switch from one power harnessing mode to another based on parameter specific threshold levels similar to SOC threshold levels. The parameter specific threshold levels can be pre-configured or configured on the fly as and when needed.

In some embodiments, the logic control and splitting of battery can be pre-configured based on an initial pdf as provided in FIG. 4 based on anticipated usage patterns. The logic control can adapt to changes in usage patterns over a period of time to derive an updated pdf based on actual usage patterns. The updated usage patterns then influence the way the various battery banks are used by the logic control to maximize the life of the batteries.

Another method of using different banks, given the pdf of usage between two charging opportunity similar to that in FIG. 4, is to have three banks of same kind, but rotate the starting of usage. For example, in the first drive B1 will be used, followed by B2 and then only B3. In the second drive, one would start with using B2 and then use B3, followed by B1. In drive three, one would start with B3, follow it up with B1 and then B2. Now given the pdf, 30% of time only the second bank would be used and only 5% of time, the third bank will be used. So in each drive mostly one bank will be used, where sometimes a second or third will be used. Given the usage statistics of FIG. 4, one can compute that for every three drives, each bank would be used 1.35 times. Thus for 3000 drives (between two charging cycles), each bank would be used only 3000*1.35/3 or 1350 times. Thus none of the banks need to be any more than 1350 cycles as opposed to 3000 cycles in single bank battery. This would reduce costs considerably. And the same battery chemistry can be used for all three banks. Further, the charging methodology will have to be appropriately modified.

It can be shown that given the pdf of usage between charging opportunities, the batteries can be divided into any number of banks of equal or unequal size, and use the banks one at a time to drive advantage. In fact, the splitting can be done in infinite banks of infinitely small get the maximum advantage. However, as the usage pattern and pdf of usage may change from customer to customer, the controller has to learn the behavior and optimize the usage. The controller can ensure all banks will be used to full life even with changing behavior, using rotation as described herein.

Power considerations

The auto-batteries are not only discharged during a drive, but could also be charged using regenerative breaking. So far we dealt with situation where a logic unit will select only one bank at a time during discharging; the same bank would be charged during regenerative breaking. We now discuss the situation where both during discharge and charge (due to regenerative breaking), it may be advantageous to use more than one bank simultaneously. Each battery bank has a charging-discharging rate called C-rate, which must not exceed a certain rate (called maximum C-rate for a battery) depending on the total capacity of the battery for life-time to be not impacted. For example, if the maximum C-rate is specified at 1C and the battery in a bank is 10 kWh (kilo-watt hour), the charging and discharging rates should generally be limited to 10 kW (kilo Watt). It is possible that vehicle may demand more than this power at a time or the regenerative breaking may produce more power at some time. Rather than using the battery beyond the C-rate, it may be advisable to combine two battery banks at that time. Since such occurrences are going to be uncommon, the combined usage of banks does not adversely impact the overall scheme.

Figure 7:
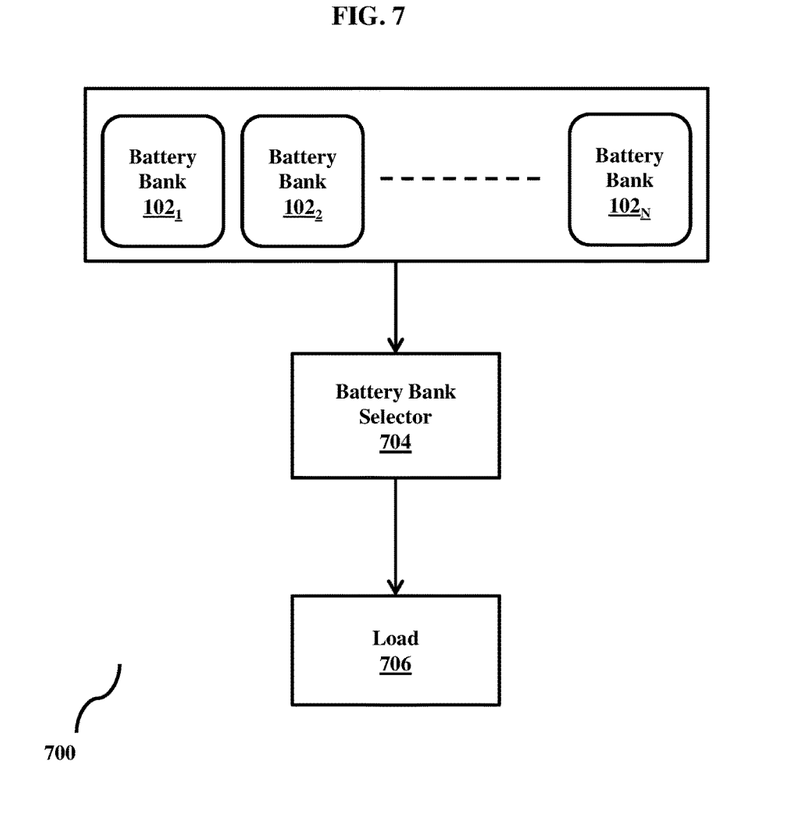
FIG. 7 illustrates an energy storage system to provide power to a load 706, according to an embodiment.

Accordingly, FIG. 7 illustrates an energy storage system to provide power to a load 706, according to an embodiment. The system includes a plurality of battery banks of varying characteristics, connected to a battery bank selector 704. In FIG. 7, the battery bank selector 704 is a logic unit as shown in FIG. 5 with the additional functionality to select multiple battery banks based on pre-configured power harnessing modes, and individual parameter specific thresholds. In scenarios where performance of a single battery bank is not adequate, the battery bank selector 704 can be used to combine output from more than one battery banks to supply power to the load 706. This may be especially required when load is varying.

Figure 8:
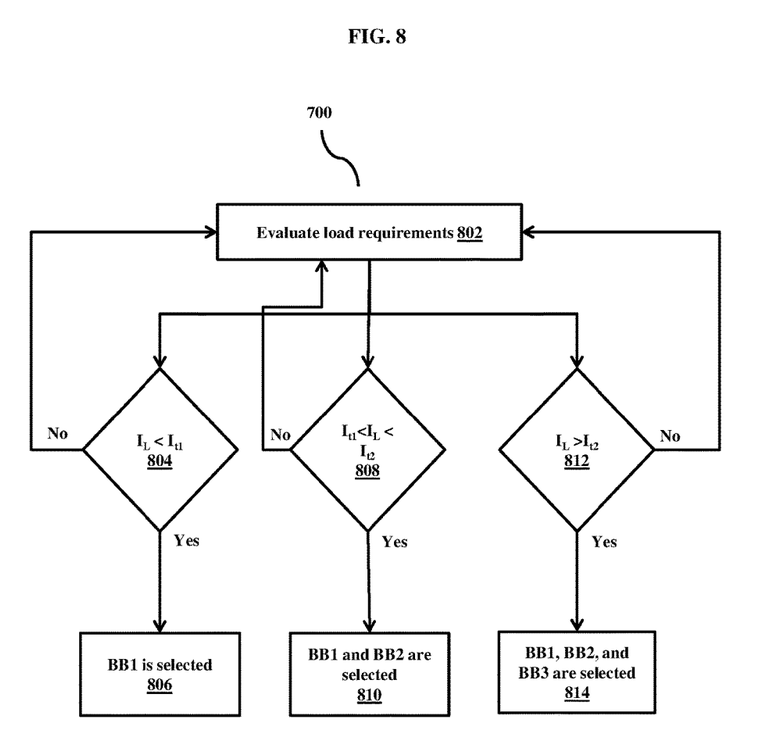
FIG. 8 is a flow chart illustrating example logic for switching from using single battery bank to using multiple battery banks, according to an embodiment herein.

An example logic for switching from using single battery bank to using multiple battery banks is illustrated in FIG. 8 in the form of a flow chart, where $I_L$ refers to the current demanded by the load, $I_{t1}$ refers to a first (lower) current threshold, and $I_{t2}$ refers to a second (upper) current threshold.

According to FIG. 8, at step 802, the battery bank selector evaluates load requirements of the system. At step 804, according to the selection criteria, if the current requirement of the load ($I_L$) is less than the lower threshold ($I_{t1}$), then battery bank B1 is selected for use at step 806. Similarly, at step 808, if the current required by load ($I_L$) is greater than the lower current threshold ($I_{t1}$) but lesser than the upper current threshold ($I_{t2}$), then B1 and B2 are selected to supply to the load at step 810. And, at step 812, if current required by load ($I_L$) is greater than the upper current threshold ($I_{t2}$) then at step 814, B1, B2, and B3 are selected.

In an embodiment, $I_{t1}$ can be the maximum current that can be drawn from B1 alone, and $I_{t2}$ can be the maximum current that can be drawn from B1 and B2 combined. While the example provided is for discharging, it is equally valid for charging.

There may be a rare situation that some of the banks are already discharged and higher C-rate than that recommended by a single battery bank is required. There are too options then. One is to use some of the battery banks beyond the normal DOD or discharge a single bank beyond the specified C-rate while the other alternative is to not provide the extra current impacting the vehicle's ability to accelerate when all but one bank is alive.

General Disclaimers

In the example embodiments described herein, a vehicle such as an electric vehicle is used as an example application. However, it will be evident to a person skilled in the art that the same arrangement of batteries can be used in other systems including but not limited to a computer, a consumer electronic device, a home appliance, other automobiles, power backup, or the like. For example, back-up generation is required for power failures up to 2 days. Instead of having same power source/back up source for two days, one can choose to have one source, which would be used very often for 4 hours. Another source which would be used once in a while, providing back-up for the next 8 hours. And a third source, used rarely, providing power for 36 hours. The fact that the usage is very frequent for first and highly infrequent for third, could be used to provide optimum costs with three different sources.

The battery bank selector and the logic unit described herein can be a Battery Management System, an Energy Management system, or any other hardware unit configured for pre-configured or selective engagement of battery banks to augment life, performance and capacity of overall battery banks in a situation where battery charging opportunity availability may vary from day to day.

The embodiments disclosed herein can be implemented through at least one software program running on at least one hardware device and performing network management functions to control the elements. The elements shown in the FIGS. 1 through 8 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. An energy storage system comprising:
  a plurality of battery banks of individual batteries based on a split configuration derived by a splitter, pre-configured with a probability distribution function (pdf) of an usage pattern of each of the plurality of battery banks between two charging opportunities, wherein each of the plurality of battery banks have varying characteristics, and, wherein the split battery configuration of the plurality of banks varies based on the pdf, an optimization goal, and battery characteristics of a corresponding single battery system; and
  a logic unit, connected to the plurality of battery banks, configured to:
    obtain performance data of each of the plurality of battery banks based on the pdf of expected usage pattern of each of the plurality of battery banks between two charging opportunities;
    select at least one battery bank, from the plurality of battery banks, to provide power to a load based on desired performance, the performance data of each said battery bank and at least one selection criterion; and
    rotate use of each battery bank from the plurality of battery banks in sequential order until next charging opportunity;
  wherein the split from a single battery bank is to optimize at least one among cost, weight or size of the system;
  wherein the selection of at least one battery bank is based on the pdf of usage pattern of each of the plurality of battery banks between two charging opportunities; and
  wherein the selection of battery banks of different characteristics are selected is to optimize at least one among weight, cost, size, and life of the system for the usage pattern without compromising on a range of the system.

2. The system of claim 1, wherein characteristic of each battery bank is different based on at least one among chemistry, variability in chemistry, energy density, size, weight, and cost.

3. The system of claim 1, wherein a required storage capacity is obtained by using the plurality of battery banks, and reducing a total cost of the system by using the required battery bank or battery banks according to the selection criterion.

4. The system of claim 1, wherein learning from the performance data of the split battery configuration is fed back to the split battery banks to improve performance.

5. The system of claim 1, where learning of performance of each battery bank under partial charge-discharge and its impact on life-time is also fed back to battery characteristic repository, to further optimize the split.

6. The system of claim 1, wherein said criteria is configured to select a battery bank out of the plurality of battery banks in a sequential order according to usage requirements based on pre-defined priorities for the plurality of battery banks or in an adaptive manner for a given application.

7. The system of claim 1, wherein the logic unit is further configured to dynamically switch from a first energy harnessing mode to a second energy harnessing mode, wherein said harnessing modes are based on usage parameters.

8. The system of claim 1, wherein the selection criteria comprises at least one threshold dynamically defined based on the plurality of usage parameters.

9. The system of claim 6, wherein the selection criteria depends upon the said battery usage parameters comprising at least one among Depth of Discharge (DoD), rate of charging, rate of discharging, and operation temperature which vary based on an application usage of the system.

10. The system of claim 7, wherein the selection criteria depends upon the said battery usage parameters comprising at least one among Depth of Discharge (DoD), rate of charging, rate of discharging, and operation temperature which vary based on the application usage of the system.

11. The system of claim 8, wherein the selection criteria depends upon the said battery usage parameters comprising at least one among Depth of Discharge (DoD), rate of charging, rate of discharging, and operation temperature which vary based on the application usage of the system.

12. The system of claim 1, wherein performance data comprises at least one of a state of charge, generated current, generated voltage, state of health and lifetime of the battery bank(s).

13. The system of claim 1, said logic unit further configured to update its logic based on said pre-configured pdf with an updated pdf based on actual usage patterns observed.

14. The system of claim 1, wherein frequency of use of different battery banks and life of the batteries from said plurality of battery banks varies based on usage probability distribution function in use.

15. An energy management method for an energy storage system configured with a plurality of battery banks, the method comprising:
    deriving a split battery configuration with a plurality of battery banks by a splitter, wherein the split battery configuration of the plurality of banks varies based on a probability distribution function (pdf) of usage pattern of each of the plurality of battery banks between two charging opportunities, an optimization goal, and battery characteristics of a corresponding single battery system;
    obtaining, by the energy storage system, performance data of each of the plurality of battery banks based on the pdf of expected usage pattern of each of the plurality of battery banks between two charging opportunities;
    selecting, by the energy storage system, at least one battery bank to provide power to a load based on desired performance, the performance data of each said battery bank and at least one selection criterion; and
    rotating use of each battery bank from the plurality of battery banks in sequential order until next charging opportunity,
    wherein the split from a single battery bank is to optimize at least one among cost, weight or size of the system, and wherein the selection of at least one battery bank is based on the pdf of usage pattern of each of the plurality of battery banks between two charging opportunities, and wherein the selection of battery banks is to optimize at least one among weight, cost, size, and life of the system for the usage pattern without compromising on a range of the system.

16. The method of claim 15, wherein characteristic of each battery bank is different based on at least one among chemistry, variability in chemistry, energy density, size, weight, and cost.

17. The method of claim 15, wherein a required storage capacity is obtained by using the plurality of battery banks, and reducing a total cost of the system by using the required battery bank or battery banks according to the selection criterion.

18. The method of claim 15, wherein said criteria is configured to select a battery bank out of the plurality of battery banks in a sequential order according to usage requirements based on pre-defined priorities for the plurality of battery banks or in an adaptive manner.

19. The method of claim 15, wherein the logic unit is further configured to dynamically switch from a first energy harnessing mode to a second energy harnessing mode, wherein said harnessing modes are based on usage parameters.

20. The method of claim 15, wherein the selection criteria comprises at least one threshold dynamically defined based on the plurality of usage parameters.

21. The method of claim 16, wherein the selection criteria depends upon the said battery usage parameters comprising at least one among Depth of Discharge (DoD), rate of charging, rate of discharging, and operation temperature which vary based on an application usage of the system.

22. The method of claim 16, wherein the selection criteria depends upon the said battery usage parameters comprising at least one among Depth of Discharge (DoD), rate of charging, rate of discharging, and operation temperature which vary based on the application usage of the system.

23. The method of claim 18, wherein the selection criteria depends upon the said battery usage parameters comprising at least one among Depth of Discharge (DoD), rate of charging, rate of discharging, and operation temperature which vary based on the application usage of the system.

24. The method of claim 15, wherein performance data comprises at least one of a state of charge, generated current, generated voltage, state of health and lifetime of the battery bank(s).

25. The method of claim 15, said logic unit further configured to update its logic based on said pre-configured pdf with an updated pdf based on actual usage patterns observed.

26. The method of claim 15, wherein frequency of use of different battery banks and life of the batteries from said plurality of battery banks varies based on usage probability distribution function in use.

* * * * *